A. M. GREEN.
TRIPPING ATTACHMENT FOR VEHICLES.
APPLICATION FILED DEC. 20, 1909.
1,013,935.
Patented Jan. 9, 1912.
2 SHEETS—SHEET 1.
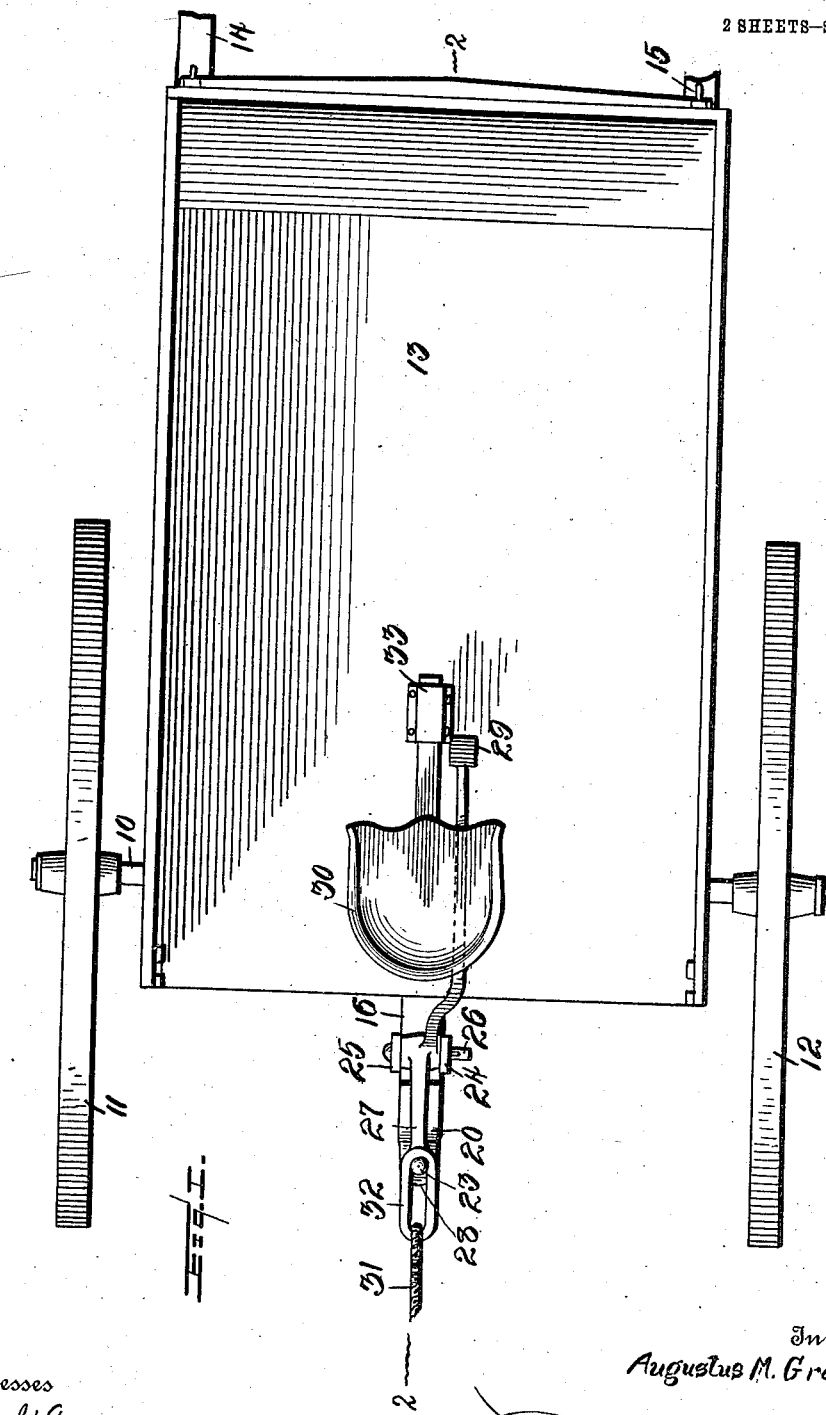
Witnesses
Jerald Hennesy.
C. N. Woodward.
Inventor
Augustus M. Green.
By
Attorney

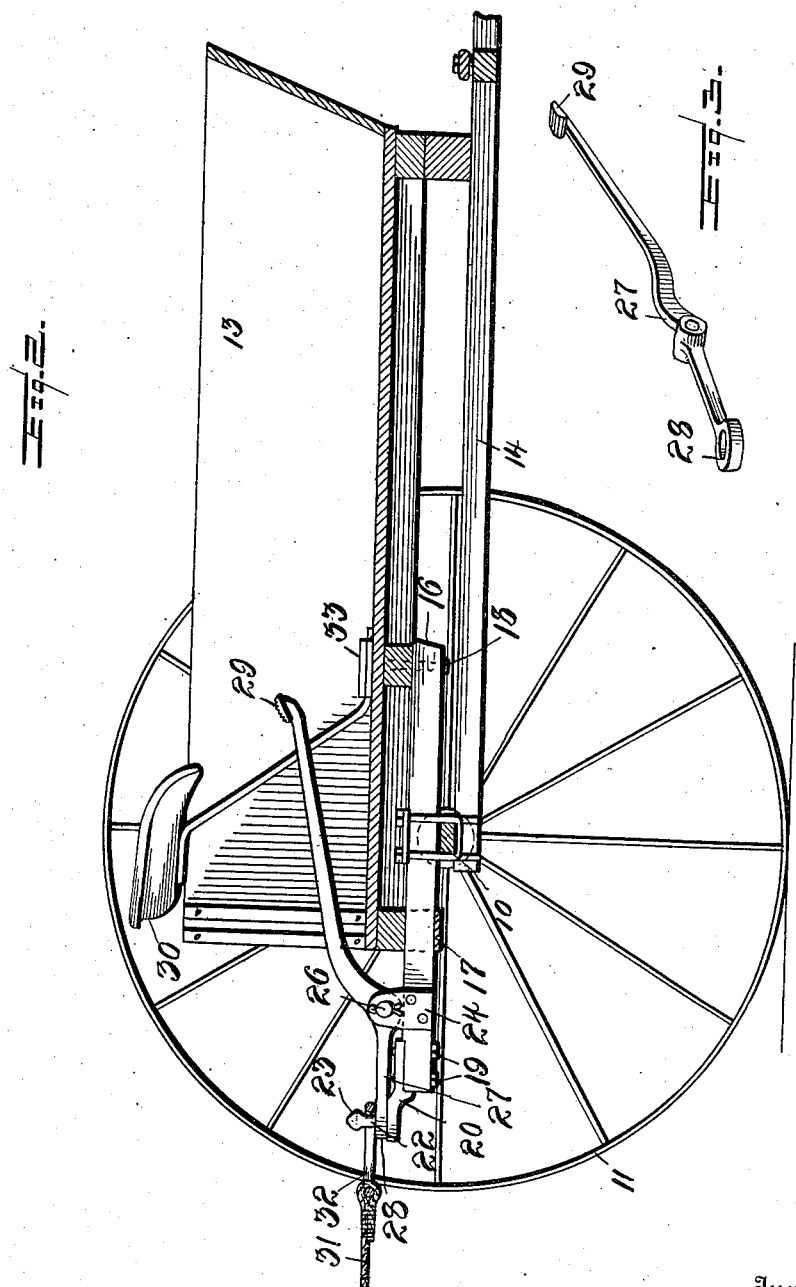

UNITED STATES PATENT OFFICE.

AUGUSTUS M. GREEN, OF HAMILTON, ILLINOIS.

TRIPPING ATTACHMENT FOR VEHICLES.

1,013,935.   Specification of Letters Patent.   Patented Jan. 9, 1912.

Application filed December 20, 1909. Serial No. 534,078.

*To all whom it may concern:*

Be it known that I, AUGUSTUS M. GREEN, a citizen of the United States, residing at Hamilton, in the county of Hancock, State of Illinois, have invented certain new and useful Improvements in Tripping Attachments for Vehicles; and I do hereby declare the following to be a full, clear, and exact description of the invention, such as will enable others skilled in the art to which it appertains to make and use the same.

This invention relates to attachments to vehicles, more particularly to the two-wheel cart class, for the purpose of operating the pull cables of hoisting devices, such as hay elevators and the like, and in which provision is made for tripping the pulling devices when the required elevation of the hoisting apparatus is reached, and has for one of its objects to provide a simply constructed device of this character of improved construction and increased utility.

With this and other objects in view, the invention consists in certain novel features of construction as hereafter shown and described and then specifically pointed out in the claim, and in the drawings illustrative of the preferred embodiment of the invention. Figure 1 is a plan view of the improved device. Fig. 2 is a side elevation in section on the line 2—2 of Fig. 1. Fig. 3 is a perspective view of the trip lever, detached.

The improved device may be applied to vehicles of various forms and construction, but is more particularly adapted for application to two-wheel carts, and for the purpose of illustration is shown thus applied, and in the drawings a conventional cart is shown including an axle 10, wheels 11—12, a body 13 and the thills 14—15.

The improved device comprises a head or supporting member 16 rigidly connected beneath the body 13 as shown at 17—18 by suitable fastening devices and extending rearwardly of the body. Connected at 19 to the member 16 is a bracket device 20 having a vertically extending stud 22, the latter formed with its upper end slightly enlarged as shown at 23. The enlarged knob-like head 23 it will be noticed has its underneath surface inverted conical in contour and forming a cam surface as will presently appear, and furthermore has its upper surface conical in contour, this upper surface forming a deflecting surface as will presently appear. Connected to the opposite sides of the member 16 near the bracket 20 are spaced standards 24—25, and pivoted at 26 between these standards is a lever arm 27, the lever arm thus being free to swing vertically upon the pivot 26. The rear end of the lever arm 27 is formed with a relatively large loop 28 which fits over the stud 22, while the forward end of the lever arm is provided with a treadle 29, the treadle being extended to a point convenient to the foot of the rider when located upon the seat 30.

The improved device is, as before stated, designed for use in connection with hoisting apparatus, more particularly hay hoists, and similar devices, and a portion of the pull cable of one of these hoisting devices is represented at 31 and is provided with a relatively long endless link or loop 32 which fits over the stud 22 and is retained in position by the enlarged head 23. The link or loop 32 is located over the stud above the loop portion 28 of the lever 27 as shown in Fig. 2, and will be retained in position with sufficient force beneath the enlarged head 23 to prevent its displacement when the cart is moved forwardly.

With a device thus constructed the driver upon the seat 30 places the horse in position near the inner end of the path of the pull member 31 and places the link 32 over the stud 22 and drives the horse forwardly to apply the requisite strain to the pull member, and when the load has been elevated to the required extent, he depresses the forward end of the lever 27 by pressure applied by the foot to the treadle 29 which elevates the shorter end of the lever arm and draws the link 32 free from the stud 22 and releases the pull member. The shorter end of the lever arm when being elevated moves the link 32 upwardly as is obvious, the underneath cam surface of the pin camming the link outwardly simultaneously with its elevating movement, the link striking against the conical deflecting surface of the pin head and sliding easily and freely off of the latter without binding, jarring, or mutilating the pin in any manner. The horse is now turned about and returned to the starting point and the operation repeated. By this means the labor of actuating the hoisting apparatus is materially decreased, without decreasing the efficiency of the hoisting apparatus. The seat member 30 is preferably detachably coupled to the cart as by a housing or cap 33, while the pivot member 26 is also preferably detachable to enable the lever and the seat to be detached when the cart is to be employed for ordinary purposes. The presence of the attachment therefore does not interfere with the ordinary uses of the cart.

What is claimed is:—

The combination with a vehicle body, of a rearwardly extending supporting bar removably secured thereto, apertured standards secured to the opposite sides of the supporting bar, a rearwardly extending bracket secured to the supporting bar, a pin extending vertically from said bracket, an enlarged head formed upon said pin and being provided with a lower beveled side, a lever pivoted between the apertured standards, a loop formed upon one end of the lever and loosely surrounding the pin, a forward extension formed upon the lever and provided upon its terminal with a foot operated treadle, an endless link surrounding said pin and held against displacement by frictional engagement with the head of said pin, the said link adapted to be disengaged from the head of the pin upon the depression of the treadle upon the upward movement of the lever substantially as and for the purpose set forth.

In testimony whereof, I affix my signature, in presence of two witnesses.

AUGUSTUS M. GREEN.

Witnesses:
 WALLACE G. HUMPHRY,
 BESSIE M. WHITE.

---

Copies of this patent may be obtained for five cents each, by addressing the "Commissioner of Patents, Washington, D. C."